(12) United States Patent
Welham et al.

(10) Patent No.: US 9,771,631 B2
(45) Date of Patent: *Sep. 26, 2017

(54) METHOD OF OXIDATIVE LEACHING OF SULFIDE ORES AND/OR CONCENTRATES

(75) Inventors: Nicholas James Welham, Ballarat (AU); Garry Mervyn Johnston, Claremont (AU); Matthew Leslie Sutcliffe, London (GB)

(73) Assignee: METALEACH LIMITED, Tortola (VG)

( * ) Notice: Subject to any disclaimer, the term of this patent is extended or adjusted under 35 U.S.C. 154(b) by 18 days.

This patent is subject to a terminal disclaimer.

(21) Appl. No.: 13/322,257

(22) PCT Filed: May 26, 2010

(86) PCT No.: PCT/AU2010/000641
§ 371 (c)(1),
(2), (4) Date: Jan. 17, 2012

(87) PCT Pub. No.: WO2010/135776
PCT Pub. Date: Dec. 2, 2010

(65) Prior Publication Data
US 2012/0103138 A1    May 3, 2012

(30) Foreign Application Priority Data
May 26, 2009    (AU) .................. 2009902406

(51) Int. Cl.
*C22B 11/00*    (2006.01)
*C22B 5/00*    (2006.01)
(Continued)

(52) U.S. Cl.
CPC ............... *C22B 3/10* (2013.01); *C22B 11/04* (2013.01); *C22B 15/0069* (2013.01);
(Continued)

(58) Field of Classification Search
CPC .............. C22B 1/00; C22B 3/00; C22B 11/00
(Continued)

(56) References Cited

U.S. PATENT DOCUMENTS 1,438,869 A    12/1922    Slater
2,205,565 A    6/1940    Kissack
(Continued)

FOREIGN PATENT DOCUMENTS

AU    200048867 A1    10/2000
CA    2478516 A1    2/2005
(Continued)

OTHER PUBLICATIONS

Ikiz et al. The optimum leaching conditions of Artvin Murgul chalcopyrite ore in hypochlorite solution, SAU Fen Bilimleri Enstitusu Dergisi 9, Cilt 2, 2005, p. 6-11.*
(Continued)

*Primary Examiner* — Xiaowei Su
(74) *Attorney, Agent, or Firm* — Harness, Dickey & Pierce, P.L.C.

(57) ABSTRACT

A method for leaching one or more target metals from a sulfide ore and/or concentrate containing such, the method comprising the steps of: (a) Exposing the ore and/or concentrate to an aqueous solution of chlorine-based oxidising species in which the hypochlorous acid comprises at least 10 mol % of the chlorine-based oxidising species; (b) Allowing and/or facilitating the oxidation of the target metals by the hypochlorous acid, thereby decreasing the pH such that the predominant chlorine-based oxidising species becomes chlorine; (c) Allowing and/or facilitating the oxidation of the target metals by the chlorine; (d) Allowing and/or facilitating the dissolution of the target metals by the solution species formed during the oxidation by hypochlorous acid
(Continued)

and/or chlorine; and (e) Passing the pregnant solution produced thereby to a means for metal recovery.

20 Claims, 7 Drawing Sheets

(51) Int. Cl.
    *C22B 3/10*     (2006.01)
    *C22B 15/00*     (2006.01)
    *C22B 3/00*     (2006.01)

(52) U.S. Cl.
    CPC .......... *C22B 19/22* (2013.01); *C22B 23/0423* (2013.01); *Y02P 10/234* (2015.11); *Y02P 10/236* (2015.11)

(58) Field of Classification Search
    USPC .......................................................... 75/744
    See application file for complete search history.

(56) References Cited

U.S. PATENT DOCUMENTS

| | | | |
|---|---|---|---|
| 5,147,617 | A | 9/1992 | Touro et al. |
| 9,057,119 | B2 * | 6/2015 | Sutcliffe .................. C22B 3/06 |
| 2008/0112864 | A1 * | 5/2008 | Lalancette ................ C22B 3/10 423/40 |

FOREIGN PATENT DOCUMENTS

| | | | |
|---|---|---|---|
| JP | 2008106347 | A * | 5/2008 |
| WO | WO-2005/031012 | A1 | 4/2005 |
| WO | WO-2007/134344 | A1 | 11/2007 |

OTHER PUBLICATIONS

Jeffrey et al. A kinetic study that compares the leaching of gold in cyanide, thiosulfate, and chloride systems. Metallurgical and Materials Transactions B, 2001, vol. 32B, p. 979-986.*
Machine translation of JP 2008106347 A, May 2008.*
Cho Leaching studies of chalcopyrite and sphalerite with hypochlorous acid, Metallurgical Transactions B, vol. 18B, 1987, p. 315-323.*
Gupta, Hydrometallurgy in extraction process, vol. II, 1990.*
Cherney et al. (Applied Spectroscopy, 2006, vol. 60, p. 764-772, hereinafter "Cherney et al.").*
International Search Report and Written Opinion for PCT/AU2010/000641, mailed Jul. 12, 2010; ISA/AU.
Reactions of Copper Sulfide Minerals With Chlorine in an Aqueous System; Groves, R.D., Smith, P.B., 1973, Bureau of Mines Report of Investigations—RI 7801.
Selective precious metals leaching from a chalcopyrite concentrate using chloride/hypochlorite media; G.V.K Puvvada, D.S.R Murthy, Hydrometallurgy 58 (2000), 185-191.
Leaching of an oxide gold ore with chloride/hypochlorite solutions; Baghalha. M., 2007, International Journal of Mineral Processing 82(4), pp. 178-186.
Leaching Studies of Chalcopyrite and Sphalerite with Hypochlorous Acid; Cho, E.H., 1987, Metallurgical Transactions B 18(2), pp. 315-323.
Leaching of Chalcopyrite with Sodium Hypochlorite; Garlapalli, R.K., Cho, E.H., Yang, R.Y.K., 2010, Metallurgical and Materials Transactions B: Process Metallurgy and Materials Processing Science 41(2), pp. 308-317.
Leaching of Chalcopyrite with Sodium Hypochlorite; Garlapalli, R., Cho, E. H. and Yang, R., 2008, Hydrometallurgy 2008: Proceedings of the 6th International Symposium, pp. 653-663.

* cited by examiner

METHOD OF OXIDATIVE LEACHING OF SULFIDE ORES AND/OR CONCENTRATES

CROSS REFERENCE TO RELATED APPLICATIONS

This application is a 371 U.S. National Stage of International Application No. PCT/AU2010/000641, filed May 26, 2010, and claims priority to Australian patent application No. 2009902406 filed May 26, 2009, the disclosures of which are herein incorporated by reference in their entirety.

FIELD OF THE INVENTION

The present invention relates to a method of leaching of metals from sulfide ores and/or concentrates containing such. More particularly, the method for leaching of the present invention utilises a chlorine-based oxidising species in the form of hypochlorous acid.

BACKGROUND ART

Prior art reports of oxidative leaching using chlorine-based oxidising species typically describe the use of gaseous chlorine in acidic solutions, where the chlorine is either supplied from gas cylinders or generated in situ. However, chlorine is not an inexpensive reagent, and the consumption of aqueous chlorine is one of the most significant factors in determining the economic feasibility of chlorine-based oxidative leaching processes. The economic problem is exacerbated by the fact that methods for chlorine production generally exclude the use of a recycled solution, as high purity sodium chloride solutions are required for economical production, where recycled solutions will inevitably contain substantial concentrations of ions deleterious to chlorine production.

Further, with several economically significant ores/concentrates, chlorine-based leaching at low pH values has demonstrated limited utility. It has been postulated that this is due to the formation of a passivating layer on the ore.

Puvaada et al (Hydrometallurgy vol. 58, 2000, p. 185-191) leached a gold/silver bearing chalcopyrite concentrate in chloride/hypochlorite media. The starting solution typically contained 0.35 M (12.8 g/L) of HCl which is a pH of <1. The addition of 25-200 g/L NaCl improved the recovery. The final recoveries, were found to be very similar at all three NaOCl concentrations, with a maximum of 32.7%. The dissolution of silver at all levels of NaOCl increased equally steadily with time and attained a maximum recovery of 22.8%.

Consequently, they pre-oxidised the concentrate by heating it in solution to 150° C. under 10-25 atm of pressure. After this pre-oxidation, leaching of the aqueous pressure-oxidized copper concentrate with 25 ml/L NaOCl, 200 g/L NaCl and 0.35 M HCl resulted in enhanced gold and silver recoveries of 90.0% and 92.5%, respectively, in 1 h. Clearly, a pre-oxidation step was essential for high recoveries of gold and silver from the ore/concentrate during subsequent acid—chloride—hypochlorite leaching.

Slater (U.S. Pat. No. 1,438,869 A, 12 Dec. 1922) claims "A process of leaching metal values from material containing such values existing therein, in part at least, as sulfide, which comprises reacting upon such material with an acid leaching solution in excess, and thereafter reacting thereupon with a chlorin-oxygen compound in the presence of free acid." The method described in Slater requires two separate leaches. First, Slater subjects ore to leaching in excess acid. The ore thus treated is then subjected to a "chlorin-oxygen" leach, also in acid solution.

CA 2478516 AL, 9 Feb. 2005 presents a process using hypochlorite as one of a long list of oxidants. This process is single stage, but utilises strong chloride solutions (>200 g/L $MgCl_2$), high acidity (30-150 g/L HCl) and elevated temperatures (>75° C.). The process also aims to convert "sulfide sulfur that is leached from the sulfide ore material is converted into hydrogen sulfide". The examples are all with solution pH of <0, the highest pH of operation within the claims is pH 2.5.

U.S. Pat. No. 2,205,565 A, 25 Jun. 1940 describes a process where sodium hypochlorite is used on "crude ore as mined, its concentrate or a partially roasted concentrate therefrom" to recover nickel and cobalt. The patent teaches that "it is important, when first applied to an ore that it have a high enough pH value, for example from 10 to 12, and be in sufficient quantity to provide the amount of oxygen required while alkalinity is maintained to oxidize all of the sulphides of nickel, cobalt and copper, together with a proportion of those of iron present in the ore, to sulphates before the solution can become sufficiently acid to prevent further oxidation due to destruction of hypochlorite with liberation of free chlorine."

Cho (*Leaching Studies of Chalcopyrite and Sphalerite with Hypochlorous Acid*, Metallurgical Transactions B, Volume 18B, June 1987) describes laboratory studies of the effect of stirring speed, temperature, pH and hypochlorous acid concentration on the leaching of chalcopyrite and sphalerite over the pH range 3.6 to 5. The solution pH was controlled by the addition of sodium hydroxide. However, from a practical perspective, the addition of base generally, and sodium hydroxide in particular, will impact adversely on the economics of the leaching process, likely to the point of rendering such unviable. Additionally, the hypochlorous acid consumption is critical to economics and Cho reported 6.0-7.2 mol HClO per mol of copper in solution.

Further work by Cho et al (R. Garlapalli, E. H. Cho and R. Yang, Leaching of chalcopyrite with sodium hypochlorite, Hydrometallurgy 2008, eds. C. A. Young, P. R. Taylor, C. G. Anderson and Y. Choi, SME, p. 653-663) indicated that the leaching reaction had a maximum rate at pH 13 when using 0.5M hypochlorite at 85° C. The hypochlorite consumption was 20-65 mol HClO per mol of copper dissolved which is patently uneconomic.

Throughout this specification, unless the context requires otherwise, the word "comprise", or variations such as "comprises" or "comprising", will be understood to imply the inclusion of a stated integer or group of integers but not the exclusion of any other integer or group of integers.

The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

DISCLOSURE OF THE INVENTION

In accordance with the present invention there is provided a method for leaching one or more target metals from a sulfide ore and/or concentrate containing such, the method comprising the steps of:
 (a) Exposing the ore and/or concentrate to an aqueous solution of chlorine-based oxidising species in which hypochlorous acid comprises at least 10 mol % of the chlorine-based oxidising species;

(b) Allowing and/or facilitating the oxidation of the target metals by the hypochlorous acid, thereby decreasing the pH such that the predominant chlorine-based oxidising species becomes chlorine;

(c) Allowing and/or facilitating the oxidation of the target metals by the chlorine;

(d) Allowing and/or facilitating the dissolution of the target metals by the solution species formed during the oxidation by hypochlorous acid and/or chlorine; and (e) Passing the pregnant solution produced thereby to a means for metal recovery.

In a highly preferred form of the invention, the ore is an unoxidsed sulfide ore and/or the concentrate is produced from unoxidised sulfide ore.

The inventors have discovered that exposure of the ore and/or concentrate to hypochlorous acid, even for a brief period, enables improved metal recovery than observed when exposed to chlorine-based oxidising agents under conditions when either chlorine or hypochlorite ions predominates.

The inventors have further found that exposure of previously unoxidised ore to hypochlorous acid enables viable metal recovery. Clearly, avoiding the need to pre-oxidise ore prior to exposing such to hypochlorous acid avoids considerable time and expense, vastly improving the economics of any hypochlorous acid-based process.

In a preferred form of the invention, the step of exposing the ore and/or concentrate to an aqueous solution of chlorine-based oxidising species in which the hypochlorous acid comprises at least 10 mol % of the chlorine-based oxidising species more specifically comprises the step of:

Initially exposing the ore and/or concentrate to an aqueous solution of chlorine-based oxidising species in which the hypochlorous acid comprises at least 10 mol % of the chlorine-based oxidising species.

The inventors have further discovered that initial exposure of the ore and/or concentrate to hypochlorous acid, even for a brief period, enables improved metal recovery than observed when exposed to chlorine-based oxidising agents.

As would be understood by person skilled in the art, embodiments of the invention methods that involve initially exposing the ore and/or concentrate to an aqueous solution of chlorine-based oxidising species in which the hypochlorous acid comprises at least 10 mol % of the chlorine-based oxidising species are distinct from embodiments where the ore and/or concentrate is initially exposed to hypochlorite under conditions where less than 10% of the chlorine-based oxidising species are hypochlorous acid, and the pH of the solution allowed to drop thereby increasing the proportion of chlorine based-oxidising species that are hypochlorous acid. Of course, such methods will be understood by a person skilled in the art to fall within the broader definition of the invention.

In a preferred form of the invention, hypochlorous acid comprises at least 20 mol % of the chlorine-based oxidising species. In a preferred form of the invention, hypochlorous acid comprises at least 30 mol % of the chlorine-based oxidising species. In a preferred form of the invention, hypochlorous acid comprises at least 40 mol % of the chlorine-based oxidising species. In a preferred form of the invention, hypochlorous acid comprises at least 50 mol % of the chlorine-based oxidising species. In a preferred form of the invention, hypochlorous acid comprises at least 60 mol % of the chlorine-based oxidising species. In a preferred form of the invention, hypochlorous acid comprises at least 70 mol % of the chlorine-based oxidising species. In a preferred form of the invention, hypochlorous acid comprises at least 80 mol % of the chlorine-based oxidising species. In a preferred form of the invention, hypochlorous acid comprises at least 90 mol % of the chlorine-based oxidising species. In a preferred form of the invention, hypochlorous acid comprises at least 95 mol % of the chlorine-based oxidising species. In a preferred form of the invention, hypochlorous acid comprises 99 mol % of the chlorine-based oxidising species, on a molar basis.

The hypochlorous acid may be generated in situ, for example by exposing the ore and/or concentrate to a combination of hypochlorite, such as sodium hypochlorite, and acid.

The present invention encompasses the simultaneous or sequential use of chlorine based oxidising species in combination with complementary oxidising species. In one form of the invention, the complementary oxidising species is iron(III) (ferric) ions.

In a preferred form of the invention, the ore and/or concentrate exposed to the aqueous solution of chlorine-based oxidising species in which the hypochlorous acid comprises at least 10 mol % of the chlorine-based oxidising species is previously unleached.

In a preferred form of the invention, the ore and/or concentrate exposed to the aqueous solution of chlorine-based oxidising species in which the hypochlorous acid comprises at least 10 mol % of the chlorine-based oxidising species is hypochlorous acid is previously unroasted.

Without wishing to be bound by theory, the inventors believe that exposure of the sulfide ore and/or concentrate to hypochlorous acid diminishes the formation of a passivating layer that may be responsible for the lower recoveries reported with chlorine leaching at low pH.

As would be understood by a person skilled in the art, hypochlorous acid is also known as chloric (I) acid, hydrogen hypochlorous acid and hydrogen chlorate (I), and has a molecular formula of HClO (or HOCl).

As would also be understood by a person skilled in the art, the term chlorine used alone refers specifically to the $Cl_2$ species.

Throughout this specification, unless the context requires otherwise, the phrase sulfoxy species refers to species comprising both sulfur and oxygen, in a range of oxidation states, including but not limited to $SO_4^{2-}$ sulfate, $SO_3^{2-}$ sulfite, $S_2O_3^{2-}$ thiosulfate, $HSO_4^-$ hydrogen sulfate (bisulfate), $HSO_3^-$ hydrogen sulfite (bisulfite), thiosulfate, $S_2O_3^{2-}$, tetrathionate, $S_4O_6^{2-}$, thiosulfite, $S_2O_2^{2-}$, $S_2O_6^{2-}$, $S_3O_6^{2-}$, $S_4O_6^{2-}$, and various protonated forms thereof.

As will be apparent to a person skilled in the art, the term sulfide ores should not be understood to be restricted to ores in which sulfur is the only non-metallic element, and encompasses ores additionally containing, for example, arsenides, tellurides, selenides, antimonides and mixtures thereof.

For example, the ores and concentrates to which the method of the present invention applies include any sulfides and/or sulfarsenides of the following metals: Zn, Pb, Cu, Ni, Co and/or Fe, including, but not limited to, sphalerite, wurtzite, galena, chalcopyrite, bornite, enargite, covellite, chalcocite, millerite, pentlandite, pyrrhotite, arsenopyrite, pyrite, nickel matte and white metal (an intermediate in copper smelting).

Figure 10:
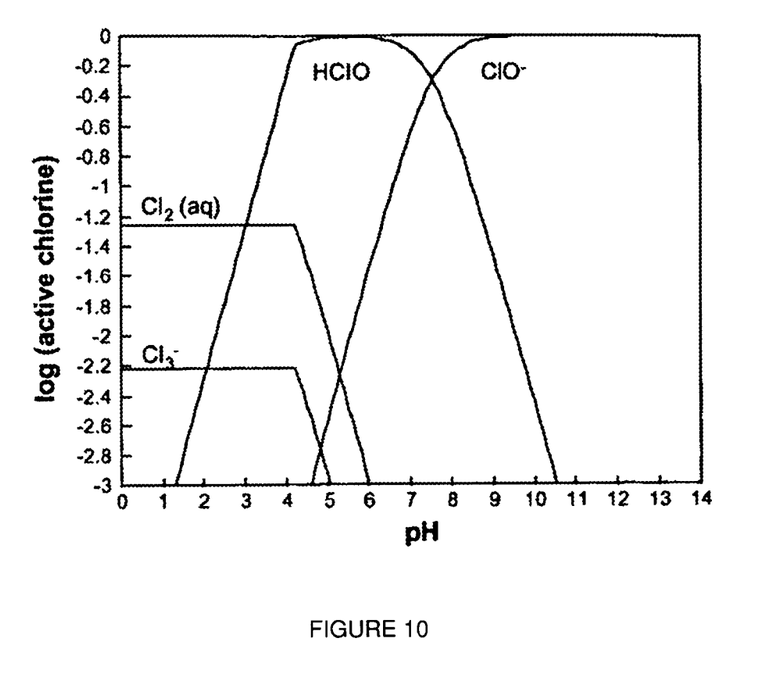
FIG. 10 is a predominance diagram for chlorine species at 25° C.

Throughout this specification, unless the context requires otherwise, the word predominant should be understood in the context of the pH predominance diagram for chlorine species at the temperature at which the method of the invention is performed. For example, a predominance diagram for chlorine species at 25° is illustrated in FIG. 10, and demonstrates that, at this temperature, chlorine ($Cl_2$) is predominant below about pH 3, hypochlorous acid (HClO) is the predominant species between about pH 3 and about pH 8, and hypochlorite (ClO) beyond pH 8. The aqueous solubility of chlorine is lower than either hypochlorous acid or hypochlorite ions.

As would be understood by a person skilled in the art, changes in temperature will change the pH range. This information is readily available from multiple sources to a person skilled in the art. For example, G. H. Kelsall, N. J. Welham and M. A. Diaz 'Thermodynamics of Cl—$H_2O$, Br—$H_2O$, I—$H_2O$, Au—Cl—$H_2O$, Au—Br—$H_2O$ and Au—I—$H_2O$ systems at 298 K', Journal of Electroanalytical Chemistry, 361(1-2), 1993, 13-24.

This is particularly relevant as the present invention encompasses methods where one or more of steps (a), (b), (c) and (d) are undertaken at elevated temperatures.

As can be seen in the predominance diagram of FIG. 10, at lower pH values, the predominant species is chlorine gas, which will readily be lost from open leaching systems, due to the limited solubility of the gas in aqueous solutions. As discussed in the background to the invention, chlorine is not an inexpensive reagent and the loss of chlorine in this manner will adversely affect the economics of any leaching method.

In a preferred form of the invention, the step of:
allowing and/or facilitating the oxidation of the target metals by the chlorine gas;
is undertaken in a closed reaction vessel.

In a preferred form of the invention, the step of:
allowing and/or facilitating the oxidation of the target metals by the hypochlorous acid, thereby decreasing the pH such that the predominant chlorine-based oxidising species becomes chlorine gas;
is undertaken in a closed reaction vessel.

In a highly preferred form of the invention, both the steps of:
allowing and/or facilitating the oxidation of the target metals by the hypochlorous acid, thereby decreasing the pH such that the predominant chlorine-based oxidising species becomes chlorine gas; and
allowing and/or facilitating the oxidation of the target metals by the chlorine gas;
take place in a closed reaction vessel.

However, because the losses due to chlorine exsolution where the predominant chlorine-based oxidising species is hypochlorous acid are considerably reduced, the method step of exposing the ore and/or concentrate to an aqueous solution of chlorine-based oxidising species in which the hypochlorous acid comprises at least 10 mol % of the chlorine-based oxidising species need not be performed in a closed reaction vessel. For example, the method step may be performed by heap leaching or atmospheric pressure leaching in an open vessel.

In a preferred form of the invention, after the step of allowing and/or facilitating the oxidation of the target metals by the chlorine, the method comprises the step of:
allowing and/or facilitating the leaching of the target metals by adventitious leaching agents.

At the low pH values at which chlorine gas predominates, the sulfide ore and/or concentrate will also advantageously be subjected to acid leaching.

Further, where the sulfide ore and/or concentrate contains a quantity of iron, after the oxidative conditions produced by the hypochlorous acid and at the low pH values at which chlorine gas predominates, the sulfide ore and/or concentrate may also be subjected to ferric leaching.

In a preferred form of the invention, after the step of allowing and/or facilitating the oxidation of the target metals by the chlorine, the method comprises the step of:
allowing and/or facilitating the leaching of the target metals by acid and/or ferric ions.

The step of allowing and/or facilitating the leaching of the target metals by acid and/or ferric ions may include the addition of further oxidant and/or acid.

In one form of the invention, air is bubbled through the reaction mixture to regenerate ferric ions. In another form of the invention, oxygen is bubbled through the reaction mixture to regenerate ferric ions.

The period for which the ore and/or concentrate is exposed to the aqueous solution of chlorine-based oxidising species in which the hypochlorous acid comprises at least 10 mol % of the chlorine-based oxidising species prior to exposure to chlorine may be controlled by controlling the pH of the aqueous solution. This may be done by the addition of base, and/or controlling the pH to thereby control sulfate production.

The preferred period for which the ore and/or concentrate is exposed to the aqueous solution of chlorine-based oxidising species in which the hypochlorous acid comprises at least 10 mol % of the chlorine-based oxidising species prior to exposure to chlorine will vary with mineralogy of the ore or concentrate. However, as will be evident from the following examples, even brief exposures may provide advantageous results.

In one form of the invention, the target metal is zinc. In one form of the invention, the target metal is copper. In one form of the invention, the target metal is cadmium. In one form of the invention, the target metal is iron. In one form of the invention, the target metal is arsenic. In one form of the invention, the target metal is lead. In one form of the invention, the target metal is silver. In one form of the invention, the target metal is nickel. In one form of the invention, the target metal is cobalt. In one form of the invention, the target metal is selenium. In one form of the invention, the target metal is tellurium. In one form of the invention, the target metal is mercury. In one form of the invention, the target metal is thallium. In one form of the invention, the target metal is gold.

In a further form of the invention, the target metal may be a combination of two or more of the aforementioned metals.

The method of the present invention may form part of a process by which metals other than the target metal are recovered. For example, the method of the present invention may be utilised to reduce the copper and/or nickel concentration of an ore prior to the ore being further processed to recover other metals, such as silver, gold and/or platinum.

The means for metal recovery of the present invention may comprise one or more solvent extraction stages, optionally followed by electrowinning or precipitation.

As will be recognised by those skilled in the art, the concentration of chlorine-based oxidising species will vary according to the concentration of the sulphide in the ore or concentrate and the specific sulphide(s) present in the ore or concentrate.

In one form of the invention, the total concentration of chlorine-based oxidant in the solution is between 0.005 mol Cl/L and saturation. In one form of the invention, the total concentration of chlorine-based oxidant in the solution is between 0.01 mol Cl/L and saturation. In one form of the invention, the total concentration of chlorine-based oxidant in the solution is between 0.02 mol Cl/L and saturation. In one form of the invention, the total concentration of chlorine-based oxidant in the solution is between 0.05 mol Cl/L and saturation. In one form of the invention, the total concentration of chlorine-based oxidant in the solution is between 0.1 mol Cl/L and saturation. In one form of the invention, the total concentration of chlorine-based oxidant in the solution is between 0.2 mol Cl/L and saturation. In one form of the invention, the total concentration of chlorine-based oxidant in the solution is between 0.5 mol Cl/L and saturation. In one form of the invention, the total concentration of chlorine-based oxidant in the solution is between 1.0 mol Cl/L and saturation. In one form of the invention, the total concentration of chlorine-based oxidant in the solution is between 1.5 mol Cl/L and saturation.

BRIEF DESCRIPTION OF THE DRAWINGS

The present invention will now be described, by way of example only, with reference to one embodiment thereof and the accompanying drawings, of which

BEST MODE(S) FOR CARRYING OUT THE INVENTION

Figure 1:
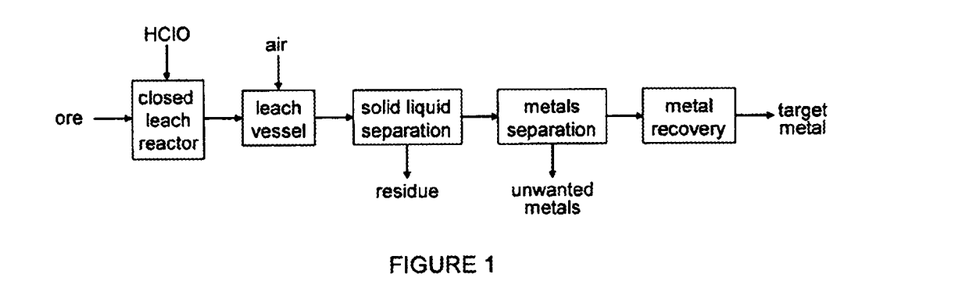
FIG. 1 is a schematic flow sheet of a method for leaching one or more target metals from a sulfide concentrate according to the present invention.

A sulfide ore 10 containing a target metal, such as chalcopyrite, is introduced into a closed leach vessel 12. An aqueous solution containing hypochlorous acid 14 is introduced into the leach vessel 12, such that the ore is exposed, for a predetermined period, to an aqueous solution in which the predominant chlorine-based oxidising species is hypochlorous acid. As a result of the consequent reduction in pH, the ore is then exposed, within the same closed leach vessel 12, to an aqueous solution in which the predominant chlorine-based oxidising species is chlorine. After a predetermined period, the resulting slurry 16 is passed to an open reaction vessel 18, into which is introduced air 20, wherein the ore is subject to leaching by the acid produced by way of the previous oxidative leaching step(s), and ferric leaching by way of ferric irons similarly produced, the air 20 at least in part regenerating the ferric ions.

After a predetermined leach period, the slurry is transferred to a solid-liquid separation phase 22, and the pregnant leach solution containing target metal ions 24 transferred to a metal separation stage 26, such as solvent extraction, ion exchange, selective precipitation, and/or cementation, whereby non-target metals are separated from the pregnant leach solution containing target metal ions 24. The resulting target metal solution 28 is then transferred to a metal recovery stage 30, such as cementation, gaseous reduction, compound precipitation, crystallisation and/or electrowinning, yielding the target metal 32.

EXAMPLES

The utility of the present invention will now be demonstrated by reference to a series of examples. The examples should not be understood as in any way limiting the generality of the preceding description of the invention.

Example 1

Figure 2:
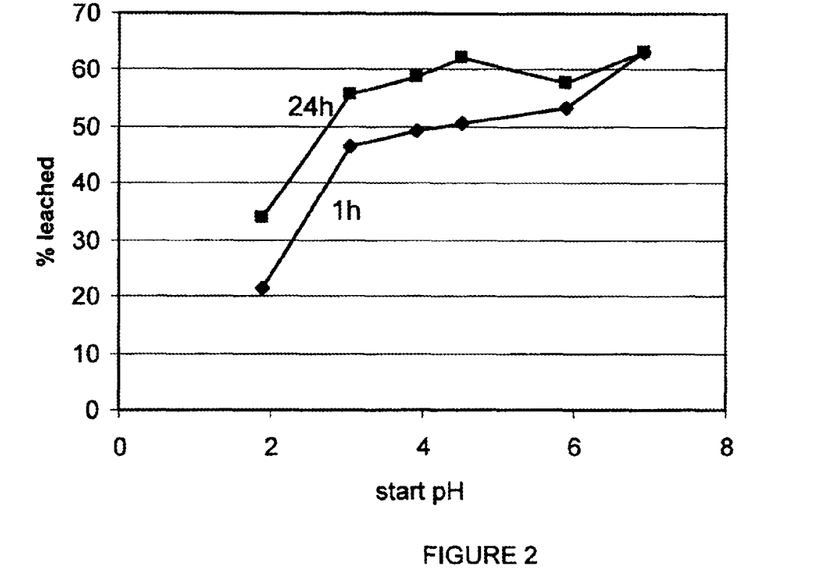
FIG. 2 is a graph showing the extent of dissolution of copper and change of pH over time for the sample of Example 1.

A specimen of chalcopyrite was hand ground and screened such that it was 100% <75 microns. A sample of this was mixed at the rate of 10 g/L with 25 g/L sodium hypochlorous acid adjusted to various starting pH using hydrochloric acid. The closed tubes containing the mixtures were shaken for 24 hours, an intermediate solution sample was taken after 1 h. As can be seen in FIG. 2, the data shows a steady decrease in copper dissolved as the starting pH decreased from around pH 7. The most notable feature is the very significant decrease in copper dissolution when the starting pH was pH 2. Clearly, the starting pH, and thus chlorine-based oxidising agent speciation, is of great importance.

Without wishing to be bound by theory, the inventors believe that exposure of the sulfide ore and/or concentrate to hypochlorous acid diminishes the formation of a passivating layer that may be responsible for the lower recoveries reported with chlorine leaching at low pH.

The solution pH decreased as the experiment progressed and after 1 h was below pH 1 for all starting pH. Despite all samples ending up similarly acidic the extent of leaching was more affected by the starting pH. Beyond the initial hour there is a similar extent of leaching after 24 h for all samples other than the one starting at pH 2, for which the extent was around 60% that of the sample starting at pH 3.

The rapidity of the reaction between the sulphide and hypochlorous acid is indicated by the majority of metal leached in solution after the first hour, the subsequent dissolution reaction is comparatively slow. It should be noted that chlorine gas remained dissolved in solution even after 24 h, so the extent of reaction is not limited by oxidant consumption.

Example 2

Figure 3:
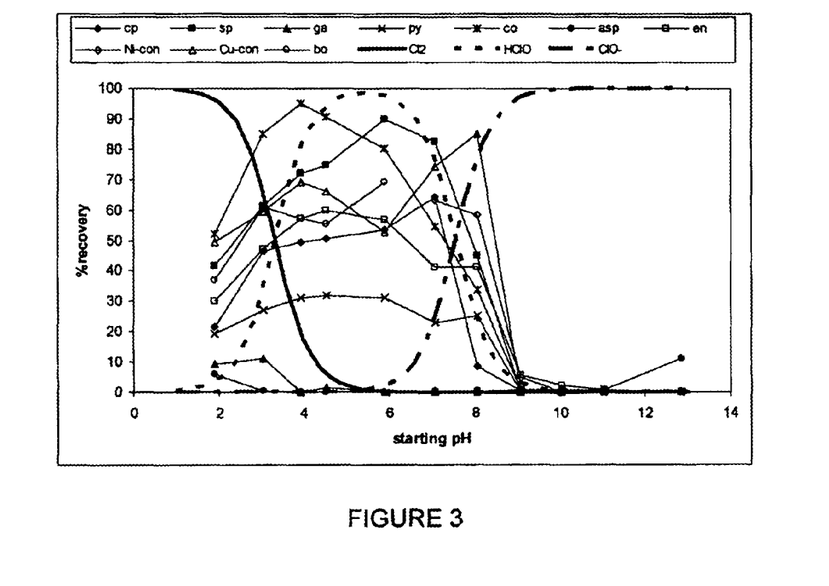
FIG. 3 is a graph showing the extent of dissolution of certain sulfide minerals over time for the various starting pH's of the samples of Example 2.

A range of different sulphide minerals (pyrite, $FeS_2$ (py), galena, PbS (ga), arsenopyrite, FeAsS (asp), enargite, $Cu_3AsS_4$ (en), chalcopyrite, $CuFeS_2$ (cp), sphalerite, ZnS (sp), bornite, $Cu_5FeS_4$ (bo) and covellite, CuS (co)) were mixed with 25 g/L sodium hypochlorite which had been adjusted to various starting pH using hydrochloric acid. The mixtures were shaken for 24 h, solution samples were taken after 1 h for analysis. The solubility after 1 h is shown in FIG. 3. The thicker lines in the Figure show the predominant chlorine-bearing species as a function of pH.

Other than arsenopyrite and galena there is a clear trend to lower dissolutions as the starting pH decreased. The starting pH is clearly important for different minerals with, for example, sphalerite requiring a much higher starting pH than covellite for the maximum extent of dissolution. This offers the opportunity for selective leaching by moderation of the starting pH.

For example, lead-zinc concentrates containing galena and sphalerite can be separated by starting the leach at pH 6 or 7—the zinc is dissolved from sphalerite whilst the lead from galena remains insoluble.

For a starting pH in the range where hypochlorite is the predominant species the extent of dissolution is clearly significantly impaired compared with a pH where hypochlorous acid predominates.

Example 3

Figure 4:
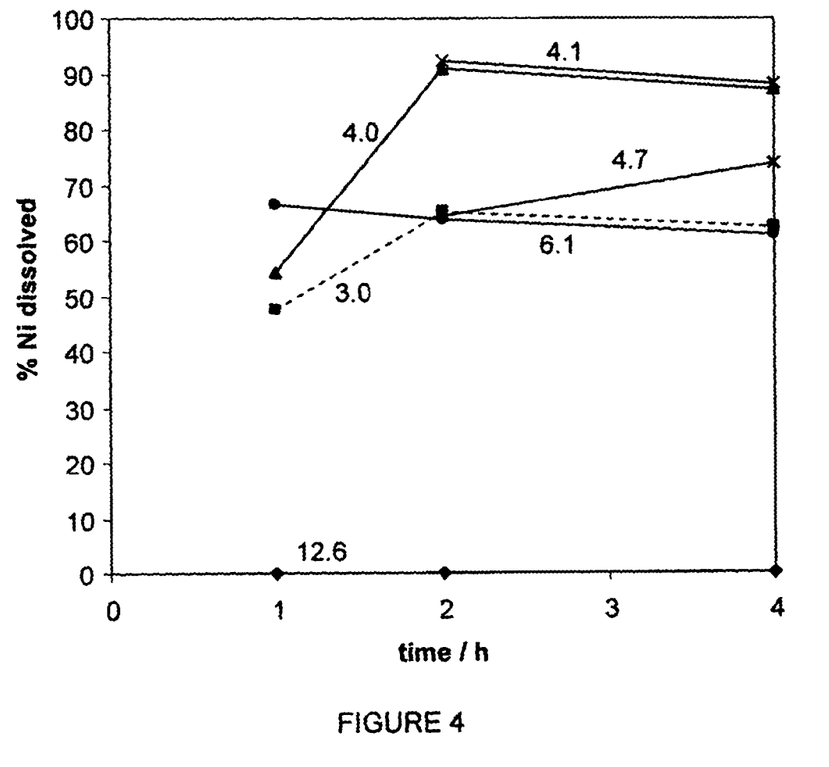
FIG. 4 is a graph showing the extent of dissolution of nickel over time and change in pH for the sample of Example 3.

A nickel flotation concentrate was mixed with 25 g/L sodium hypochlorite solution adjusted to various pH at a mass to weight ratio of 1:100. The mixture was shaken and samples taken for up to 4 h for solution analysis. A plot of the nickel dissolution up to 4 h is shown in FIG. 4.

This plot shows clearly the effect of starting pH with a pH of around 4 giving the greatest extent of leaching after 2 h. Lower and higher starting pH showed lower dissolutions for nickel.

A series of further experiments were conducted at a starting pH of 4. In these the solid to solution ratio was increased from 4 g/L to 40 g/L. The proton production was estimated from the pH change. The data is shown in the bar chart that comprises FIG. 5.

Figure 5:
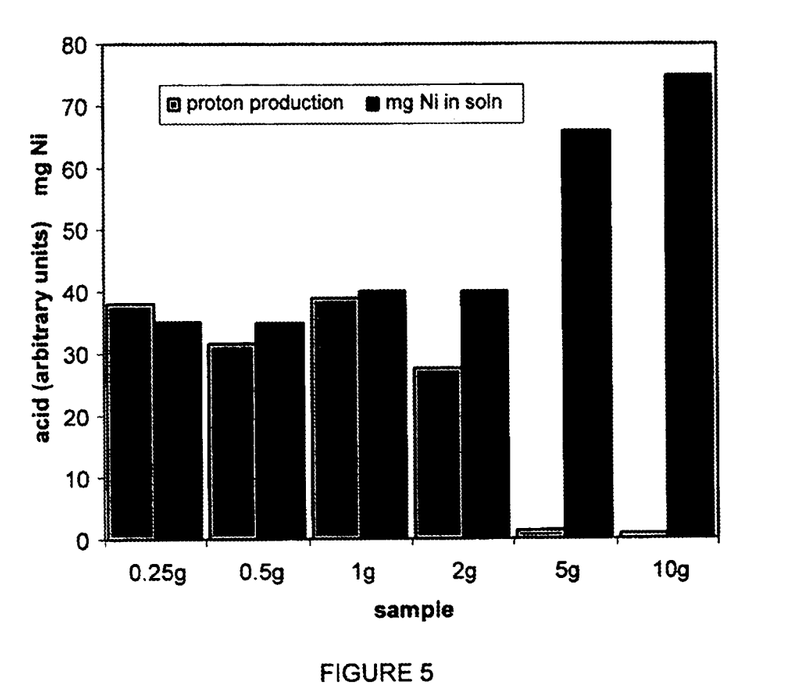
FIG. 5 is a bar chart showing the extent of leaching or dissolution of nickel and proton production over time for the samples of Example 4.

At masses up to 2 g, the nickel solubility and proton production are much the same. When there is a larger mass of concentrate the proton production is substantially lower and the nickel in solution is much higher. Clearly, where there is more concentrate than oxidant there is a reaction between the concentrate and protons resulting in a greater extent of nickel dissolution than with hypochlorous acid alone.

Example 4

A chalcopyrite concentrate and pure mineral specimens of chalcopyrite and covellite were reacted with a hypochlorous acid solution for 1 h. Iodimetric titrations were performed on the starting and final solutions to determine the hypochlorous acid concentrations before and after reaction in order to measure the consumption.

The starting and decanted solutions had excess iodide ions added to be converted from iodide to iodine by oxidation:

$2I^- + HClO + H^+ = I_2 + H_2O + Cl^-$

The iodine was then titrated using sodium thiosulphate of known concentration, the relevant reaction is:

$I_2 + 2S_2O_3^{2-} \rightarrow 2I^- + S_4O_6^{2-}$

From these titrations the concentration of hypochlorous acid before and after reaction can be determined with consumption simply being the difference between them.

The consumption of hypochlorous acid for the chalcopyrite concentrate and the pure mineral specimen were 3.6 and 3.4 mol HClO per mol of copper in solution. These values are very substantially lower than the range of 6.0-7.2 reported by Cho (Eung Ha Cho: Leaching Studies of Chalcopyrite and Sphalerite with Hypochlorous Acid, Metallurgical Transactions B, Volume 18B, June 1987) and the value of 8.5 mol $Cl_2$/mol Cu reported for an acid solution of chlorine gas by Groves and Smith (R. D. Groves, P. B. Smith, Reactions of copper sulfide minerals with chlorine in a aqueous system. U.S. Bureau of Mines Report of Investigation 7801 (1973)).

For covellite the ratio was 1.0 mol HClO per mol of copper in solution, which could correspond to the following chemical reaction:

$CuS + HClO + H^+ = Cu^{2+} + S + H_2O + Cl^-$

This compared very favourably with the value of 4.0 reported by Groves and Smith.

Clearly, there is a marked economic advantage over the prior art which controlled the solution pH and/or used an acidic solution of chlorine gas.

Example 5

Figure 6:
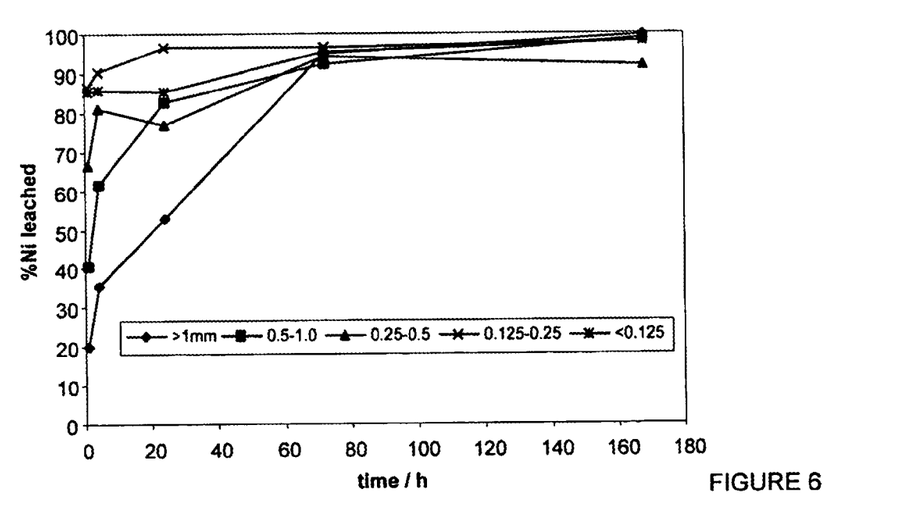
FIG. 6 shows the extent of nickel leaching as a function of time for various particle size samples of Example 5.

A pentlandite—pyrrhotite bearing nickel ore (1.02% Ni) was screened to give five size fractions. These were separately leached under otherwise identical conditions for up to 168 h (1 week). FIG. 6 shows the extent of leaching as a function of time.

The two outcomes of this data are that leaching is clearly size dependent with longer times required to achieve high recovery for larger particle sizes. Even for the largest particle size the recovery of nickel was complete in three days (72 h).

A person skilled in the art will recognise that leaching is particle size dependent as larger particles result in lengthened diffusion pathways and reduced exposure of the target mineral to the leaching solution due to occlusion. The rate of leaching of the smallest particle sizes is extremely rapid with >80% nickel dissolution within 24 h for all except the largest particle size fraction.

Example 6

Figure 7:
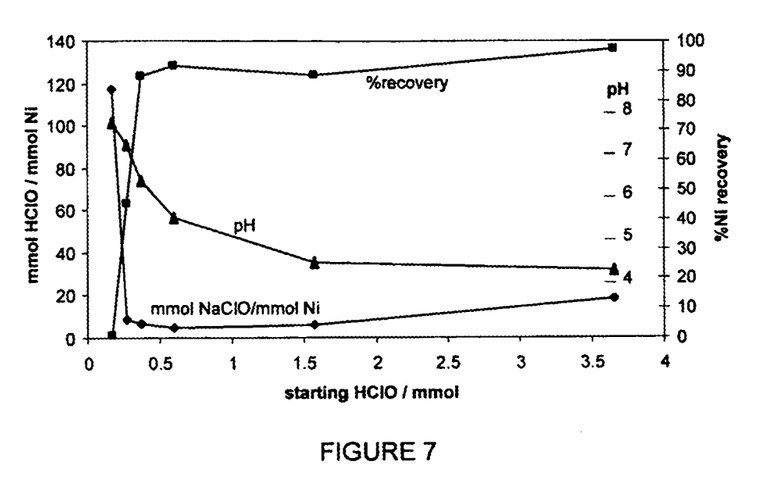
FIG. 7 is a graph showing the extent of dissolution of nickel under the various experiments of Example 6.

Further samples of the <0.125 mm size fraction used in Example 5 was contacted with increasing concentrations of hypochlorous acid solutions produced by acidification of a sodium hypochlorite solution to pH 8. Iodimetric titrations were performed both before and after the leaching to determine the consumption of hypochlorous acid. Solution analysis provided the nickel recoveries, the final solution pH was also measured. The results of these experiments are shown in FIG. 7.

The nickel dissolution is essentially 100% until the starting concentration was reduced below 0.38 mmol/25 mL. Below this, there was insufficient acid production to reduce the solution pH below 7, above pH 7 nickel would precipitate as its hydroxide giving a low nickel tenor in solution. This is most obvious with the lowest starting concentration where only 1 ppm Ni was in solution resulting in an extremely high apparent consumption. The other samples had consumptions of 4.8-18.3 mol HClO/mol Ni. The highest starting hypochlorous acid concentration had a high consumption, without wishing to be bound by theory, the inventors believe that at higher hypochlorous acid concentrations there is an increased extent of natural degradation of the oxidant resulting in increased losses to non-nickel leaching processes and a greater consumption. If the lowest and highest data is not considered the consumption of hypochlorous acid was 4.8-8.4 mol HClO/mol Ni.

Example 7

Further runs were made on two size fractions (<0.4 mm and 1.0-3.2 mm) of the same ore as in Examples 5 and 6, the larger size fraction was water washed to remove all <1.0 mm material prior to leaching. Solutions of hypochlorous acid were made up by acidifying a sodium hypochlorite solution. 50.0 g of each size fraction was placed into a 1 L wide necked plastic bottle, a stock 125 g/L NaClO solution was acidified to pH 4.5 using concentrated HCl to form a hypochlorous acid solution, 250 mL of this hypochlorous acid solution was then added to each size fraction. The bottles were agitated constantly. Samples were taken periodically and analysed by iodimetry to determine hypochlorous acid levels and analysed for nickel in solution. The results of these tests are shown in FIGS. 8 and 9.

Figure 8:
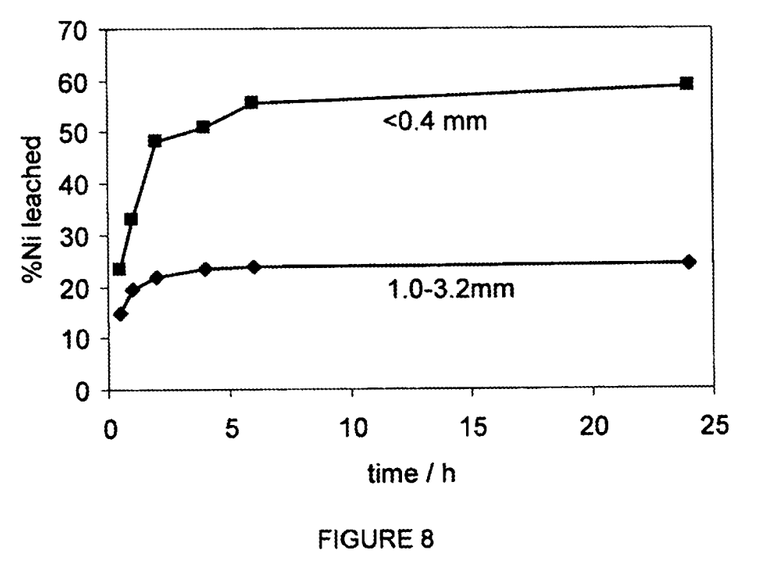
FIG. 8 is a graph showing the extent of leaching of nickel over time for the sample of Example 7.

FIG. 8 shows the nickel recovery is more rapid for the finer size fraction, this is entirely expected to those skilled in the art. The lower extent of dissolution for the coarser size fraction is also to be expected by those skilled in the art. This results from two factors, occlusion of mineral particles within the ore matrix precluding exposure of the mineral to the solution, and increased length of pores.

Figure 9:
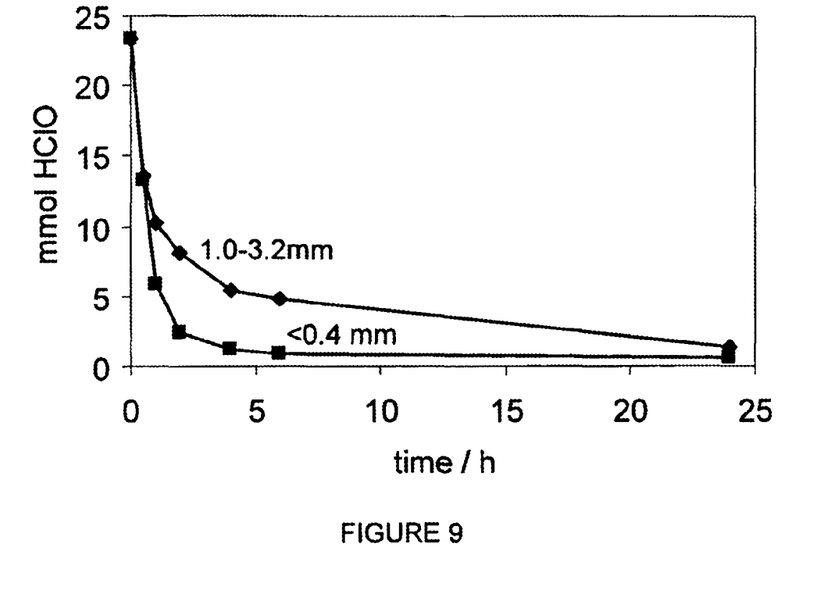
FIG. 9 shows the amount of hypochlorous acid remaining in solution over time for the sample of Example 7.

FIG. 9 shows the amount of hypochlorous acid remaining in solution as a function of time. Clearly, the mass of hypochlorous acid in the starting solution was insufficient to give any greater extent of nickel in solution with essentially all hypochlorous acid being consumed within 6 h for the <0.4 mm size fraction, beyond this time only a very small amount of extra nickel was leached, most probably due to a combination of oxidation through exposure to air and attack by the protons formed during the oxidation.

The lack of sufficient hypochlorous acid was confirmed by repeating the run using a lower slurry density such that the starting ratio of hypochlorous acid to nickel was much higher. After 50 minutes of leaching the dissolution of nickel from the <0.4 mm and 1.0-3.2 mm size fractions were 85% and 60% respectively.

As will be recognised by someone skilled in the art, the concentration and volume of hypochlorous acid solution used is a function of the headgrade of the target metal, the distribution of the metal in the ore and the particle size of the ore.

The claims defining the invention are as follows:

1. A method for leaching one or more target metals from a sulfide concentrate, wherein the sulfide concentrate contains a quantity of iron, the method comprising:
   (a) Exposing the sulfide concentrate to an aqueous solution of chlorine-based oxidising species in which hypochlorous acid comprises at least 10 mol % of the chlorine-based oxidising species;
   (b) Oxidizing the target metals with the hypochlorous acid,
   (c) Decreasing the pH of the aqueous solution to below 1.0, such that the predominant chlorine-based oxidising species becomes chlorine;
   (d) Oxidizing the target metals with the chlorine;
   (e) Dissolving the target metals formed during the oxidation by the hypochlorous acid and the chlorine; and
   (f) Recovering the target metals from a pregnant solution produced thereby.

2. The method according to claim 1, wherein the sulfide concentrate is an unoxidised sulfide concentrate.

3. The method according to claim 1, wherein the hypochlorous acid is generated in situ.

4. The method according claim 1, wherein the chlorine-based oxidising species is simultaneously used in combination with a complementary oxidising species.

5. The method according to claim 4, wherein the complementary oxidising species is in the form of iron(III) ions.

6. The method according to claim 1, wherein the chlorine-based oxidising species is sequentially used in combination with a complementary oxidising species.

7. The method according to claim 6, wherein the complementary oxidising species is in the form of iron(III) ions.

8. The method according to claim 1, wherein the sulfide concentrate is previously unleached.

9. The method according to claim 1, wherein the sulfide concentrate is previously unroasted.

10. The method according to claim 1, wherein the oxidizing of the target metals by the chlorine is undertaken in a closed reaction vessel.

11. The method according claim 1, wherein the oxidizing of the target metals by the hypochlorous acid is undertaken in a closed reaction vessel.

12. The method according to claim 1, wherein both the oxidizing of the target metals by the hypochlorous acid and the oxidizing of the target metals by the chlorine takes place in a closed reaction vessel.

13. The method according to claim 1, wherein the exposing the sulfide concentrate to the aqueous solution of chlorine-based oxidising species is performed by heap leaching, or atmospheric leaching in an open vessel.

14. The method according to claim 1, wherein after the oxidation of the target metals by the chlorine, the method further comprises leaching of the target metals by adventitious leaching agents.

15. The method according to claim 14, wherein the leaching of the target metals by the adventitious leaching agent includes the addition of further oxidant and/or acid.

16. The method according to claim 1, wherein air or oxygen is bubbled through the reaction mixture.

17. The method according to claim 1, wherein the sulfide concentrate is exposed to the aqueous solution of chlorine-based oxidising species in which the hypochlorous acid comprises at least 10 mol % of the chlorine-based oxidising species prior to exposure to chlorine for a period of time controlled by controlling the pH of the aqueous solution.

18. The method according to claim 1, wherein the target metal is at least one selected from the group consisting of zinc, copper, cadmium, iron, arsenic, lead, silver, nickel, cobalt, selenium, tellurium, mercury, thallium and gold.

19. The method according to claim 1, wherein the concentration of the chlorine-based oxidizing species in the solution is within the range of 0.05 mol Cl/L and saturation.

20. A method for forming a pregnant solution comprising a target metal, comprising exposing a sulfide concentrate, wherein the sulfide concentrate contains a quantity of iron, to an aqueous solution of chlorine-based oxidising species in which a hypochlorous acid comprises at least 10 mol % of the chlorine-based oxidising species, oxidizing the concentrate with the hypochlorous acid, thereby decreasing the pH of the solution to below 1.0 such that the predominant chlorine-based oxidizing species becomes chlorine and aqueous ferric ions are formed, oxidising the target metals with the chlorine, and leaching the target metal by the ferric ions.

* * * * *

UNITED STATES PATENT AND TRADEMARK OFFICE
CERTIFICATE OF CORRECTION

PATENT NO. : 9,771,631 B2
APPLICATION NO. : 13/322257
DATED : September 26, 2017
INVENTOR(S) : Nicholas James Welham et al.

It is certified that error appears in the above-identified patent and that said Letters Patent is hereby corrected as shown below:

On the Title Page

Column 1, (75) Inventors, Line 1, delete "Ballarat" and insert --Ballarat, Victoria-- therefor Column 1, (75) Inventors, Line 3, delete "Claremont" and insert --Claremont, Western Australia-- therefor In the Specification Column 2, Background Art, Line 44, Delete "85° C." and insert --85 °C.-- therefor Column 5, Disclosure of the Invention, Line 5, Delete "(CIO)" and insert --(CIO-)-- therefor Column 7, Brief Description of the Drawings, Line 42, Delete "hvpochlorous" and insert --hypochlorous-- therefor Column 7, Brief Description of the Drawings, Line 45, Delete "25° C." and insert --25 °C.-- therefor In the Claims Column 11, Claim 1, Line 52, delete "1.0," and insert --1.0-- therefor Column 12, Claim 4, Line 1, before "claim 1,", insert --to--

Column 12, Claim 6, Line 6, before "claim 1,", insert --to--

Column 12, Claim 11, Line 17, before "claim 1,", insert --to--

Signed and Sealed this
Twenty-first Day of November, 2017

Joseph Matal
*Performing the Functions and Duties of the
Under Secretary of Commerce for Intellectual Property and
Director of the United States Patent and Trademark Office*